A. CLEVELAND.
TREE AND PLANT IRRIGATOR.
APPLICATION FILED JUNE 12, 1907.
903,452.
Patented Nov. 10, 1908.
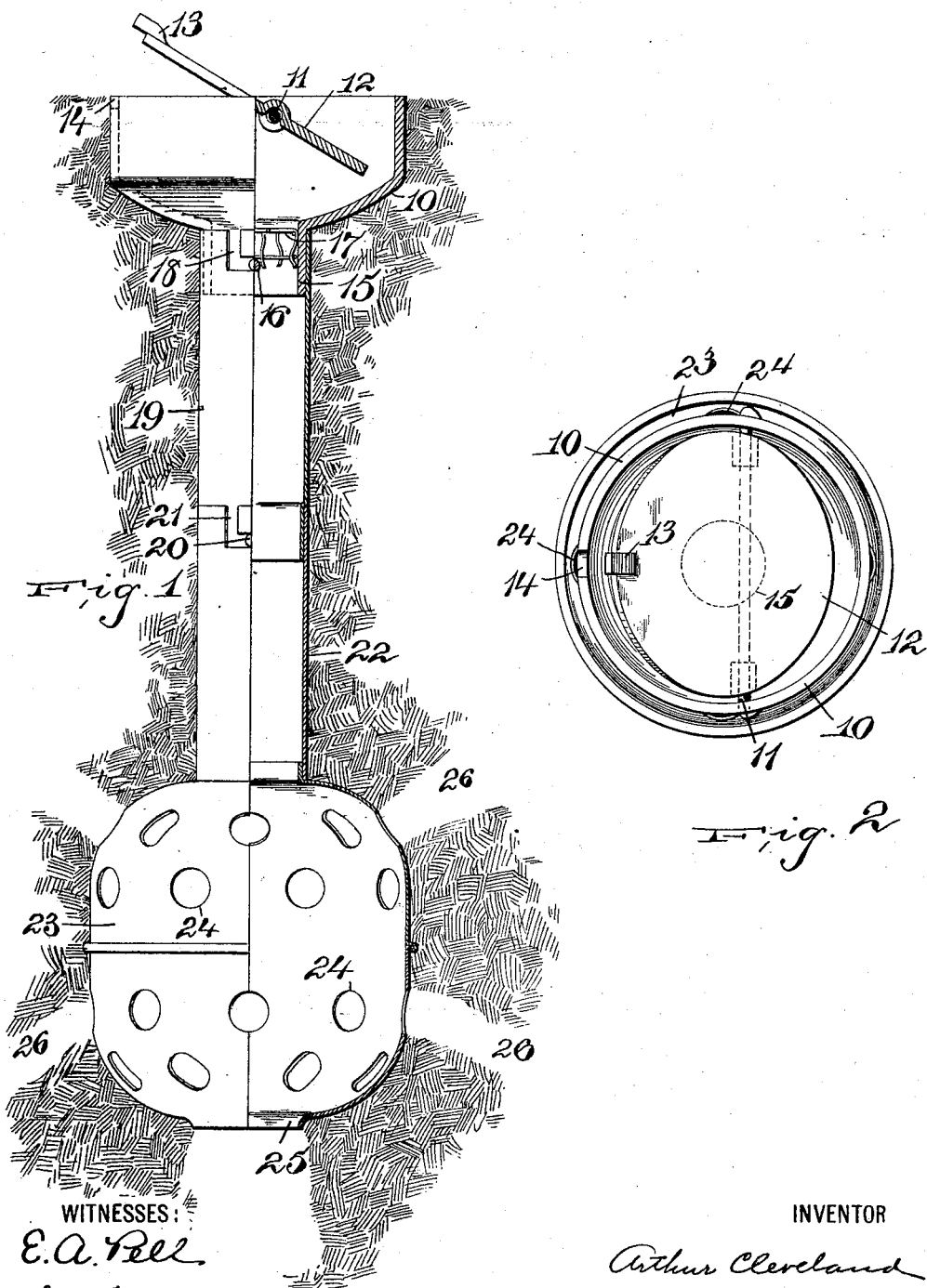
WITNESSES:
E. A. Bell
S. A. Rogers.
INVENTOR
Arthur Cleveland
BY
Wm. H. Campfield
ATTORNEY

UNITED STATES PATENT OFFICE.

ARTHUR CLEVELAND, OF NEWARK, NEW JERSEY.

TREE AND PLANT IRRIGATOR.

No. 903,452.  Specification of Letters Patent.  Patented Nov. 10, 1908.

Application filed June 12, 1907. Serial No. 378,675.

*To all whom it may concern:*

Be it known that I, ARTHUR CLEVELAND, a citizen of the United States, residing at Newark, in the county of Essex and State of New Jersey, have invented certain new and useful Improvements in Tree and Plant Irrigators; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a plant moistener, and is designed to provide a reservoir to be sunk underneath the ground and to feed the roots of the plants from the bottom, and thus draw the plants downward through the ground.

The invention also provides a bowl, with a closure, which is on top of the ground, or flush therewith, that provides a means for feeding the reservoir with a plant food or with water, the bowl being connected with the reservoir by a detachable coupling, and I may also employ tubular sections to be detachably secured end to end, whereby the distance the reservoir is to be lowered into the ground can be regulated.

The invention is illustrated in the accompanying drawing, in which—

Figure 1 is a view, one half being in elevation, and the other half in section, and Fig. 2 is a top view of Fig. 1.

As plants are now watered, that is by pouring water on the surface of the ground, the roots are drawn toward the water and consequently have somewhat of an upward tendency unless the ground is very well moistened underneath, and when the roots are near the surface, if an extremely dry spell occurs, or for any reason the watering of the plants is infrequent, the sun will quickly dry the roots and the plants do not thrive.

In my construction I employ a bowl 10 which has a transverse rod 11 therein which acts as a pivot for the lid 12. The rod 11 is placed to one side of the center of the bowl, and thus one end of the lid is heavier than the other and normally falls shut to close the moistener. A lip 13 provides for the opening or manual manipulation of the lid 12, the lip also acting as a stop for the lid when it enters the recess 14 of the bowl 10. The lid is also opened by pressing a hose-nozzle or any other outlet of water against the lighter side of the lid, and thus forcing it downward when the reservoir can be filled with water. Depending from the bowl 10 is a flange 15 which has a pin 16, running through it, which serves to support a suitable sieve 17 to prevent leaves, stones or other obstructions from falling down into the device. The pin also serves as a locking means by fitting into the slot 18 of the tubular section 19, thus forming a bayonet lock and securing the parts together. The tubular section 19 has a pin 20 near the bottom of it, and the sleeve 22 has a slot 21 to form another bayonet lock.

It will be understood that the sleeve 19 can be supplied to any desired number and placed end to end so that the tubular portion of the device can be made of any length. Secured to the bottom of the sleeve 22 is a reservoir 23 which can be made circular, or any other suitable form, and is provided with perforations 24, distributed over its surface, so as to allow the water or plant food poured into the moistener to escape from the reservoir and be slowly fed into the ground surrounding the device. In the bottom of the reservoir, and in line with the tubular portion of the device, is a comparatively large perforation 25 which allows stones or any obstructions that might pass through the sieve 17 or fall down in the absence of the sieve, to drop and not be allowed to accumulate in the bottom of the reservoir. The water that is fed into the reservoir will establish, for itself, channels 26 opposite each opening 24, and thus serve to aerate the roots of the plants and cause a more healthy growth.

This device can be made of all sizes, and by means of the sectional construction of the tubular portion, any depth can be attained. In the case of trees the moistener is sunk to a considerable depth and made of a comparatively large size, and there is no mud caused around a flower-bed or tree when this device is used.

The device is preferably made of metal, and usually of a non-corrosive kind, such as zinc, and it is an economical device to make. The bowl can be made in the form of a slight enlargement of the tubular portion, and it need not cover a very large area, and it is preferably placed with its top level with the ground, so as to cause no unsightly appearance.

Having thus described my invention, what I claim is:—

A plant moistener comprising a bowl having a lid pivoted therein, the lid being pivoted to one side of its center and intermediate of its ends to cause it to normally close, a flange depending from the bowl, a pin in the flange and projecting therefrom, a tubular section having a slot to be locked on the pin of the flange, a pin projecting from the end of the tubular section, a perforated substantially spherical reservoir having a large perforation in its bottom, and having a sleeve in line with the large perforation, the sleeve having a slot to engage the pin of the tubular section to cause the parts to be detachably secured together.

In testimony, that I claim the foregoing, I have hereunto set my hand this 5th day of June 1907.

ARTHUR CLEVELAND.

Witnesses:
  Wm. H. Camfield,
  E. A. Pell.